US008089923B2

(12) United States Patent
Ito et al.

(10) Patent No.: US 8,089,923 B2
(45) Date of Patent: Jan. 3, 2012

(54) RADIO BASE DEVICE, MOBILE TERMINAL DEVICE, REFERENCE SIGNAL CONTROL METHOD, AND REFERENCE SIGNAL CONTROL PROGRAM

(75) Inventors: Tadayoshi Ito, Hashima (JP); Takeo Miyata, Gifu (JP)

(73) Assignee: Kyocera Corporation, Kyoto (JP)

( * ) Notice: Subject to any disclaimer, the term of this patent is extended or adjusted under 35 U.S.C. 154(b) by 899 days.

(21) Appl. No.: 10/528,108

(22) PCT Filed: Sep. 18, 2003

(86) PCT No.: PCT/JP03/11944
§ 371 (c)(1),
(2), (4) Date: Mar. 16, 2005

(87) PCT Pub. No.: WO2004/028193
PCT Pub. Date: Apr. 1, 2004

(65) Prior Publication Data
US 2005/0254450 A1      Nov. 17, 2005

(30) Foreign Application Priority Data

Sep. 20, 2002   (JP) .................................. 2002-274630

(51) Int. Cl.
*H04W 4/00* (2009.01)
(52) U.S. Cl. ........ 370/329; 455/450; 455/464; 455/509; 455/422.1; 455/460
(58) Field of Classification Search .................. 370/329; 455/450, 464, 509, 422.1, 460
See application file for complete search history.

(56) References Cited

U.S. PATENT DOCUMENTS

| 5,410,588 | A | * | 4/1995 | Ito ................................. | 455/502 |
| 5,774,462 | A | * | 6/1998 | Ishikawa et al. .............. | 370/350 |
| 6,456,610 | B1 | * | 9/2002 | Briley ........................... | 370/337 |
| 6,483,819 | B1 | * | 11/2002 | Take et al. .................... | 370/329 |
| 6,490,455 | B1 | * | 12/2002 | Park et al. .................. | 455/456.4 |
| 6,563,806 | B1 | * | 5/2003 | Yano et al. .................... | 370/330 |

(Continued)

FOREIGN PATENT DOCUMENTS

JP            10-145282           5/1998

(Continued)

OTHER PUBLICATIONS

T. Miyata et al., "A Study of Training Signal Pattern for SDMA System," Technical Report of IEICE, vol. RCS2002-47, 2002, pp. 177-182.

*Primary Examiner* — Phuoc Doan
*Assistant Examiner* — Diego Herrera
(74) *Attorney, Agent, or Firm* — Foley & Lardner LLP

(57) ABSTRACT

When the number of multiplexed connections of PSs to a CS is changed due to issuance of a connection request from other PS to the CS or the like, the CS selects a unique word pattern (new unique word) optimal for the new number of multiplexed connections, so as to request switching from an old unique word to a new unique word to each PS of the user who has established multiple access. When a response to the request for switching is received from the PS of each user, the CS transmits a synchronous burst signal including the new unique word to the PS, and the PS also returns the synchronous burst signal including the new unique word. Synchronization is thus established.

24 Claims, 6 Drawing Sheets

U.S. PATENT DOCUMENTS

| | | | |
|---|---|---|---|
| 6,690,665 B1 * | 2/2004 | Choi et al. | 370/376 |
| 6,763,237 B1 * | 7/2004 | Katz | 455/450 |
| 6,766,146 B1 * | 7/2004 | Park et al. | 455/69 |
| 6,768,724 B1 * | 7/2004 | Olkkonen | 370/310.1 |
| 6,836,484 B2 * | 12/2004 | Suzuki | 370/465 |
| 6,856,397 B2 * | 2/2005 | Huston et al. | 356/450 |
| 6,909,704 B2 * | 6/2005 | Sakoda | 370/335 |
| 6,967,936 B1 * | 11/2005 | Laroia et al. | 370/329 |
| 7,039,368 B2 * | 5/2006 | Brunner et al. | 455/101 |
| 7,062,294 B1 * | 6/2006 | Rogard et al. | 455/562.1 |
| 7,072,324 B1 * | 7/2006 | Kim et al. | 370/342 |
| 7,190,687 B1 * | 3/2007 | Hsu et al. | 370/338 |
| 2001/0019952 A1 * | 9/2001 | Ishida | 455/414 |
| 2001/0046214 A1 * | 11/2001 | Kang | 370/328 |
| 2002/0039886 A1 * | 4/2002 | Doi | 455/25 |
| 2003/0013476 A1 * | 1/2003 | Park et al. | 455/522 |
| 2003/0067883 A1 * | 4/2003 | Azenkot et al. | 370/252 |
| 2003/0140303 A1 * | 7/2003 | Litwin et al. | 714/785 |
| 2003/0156569 A1 * | 8/2003 | Kawakami et al. | 370/345 |

FOREIGN PATENT DOCUMENTS

| | | |
|---|---|---|
| JP | 2001-008262 | 1/2001 |
| JP | 2001-231072 | 8/2001 |
| JP | 2002-516550 | 6/2002 |
| WO | WO 99/60809 | 11/1999 |
| WO | WO 9959263 A1 * | 11/1999 |
| WO | WO 02/07344 A1 | 1/2002 |

* cited by examiner

| UW FOR NO MULTIPLEXING | UW FOR DUPLEX | UW FOR TRIPLEX | UW FOR QUADRUPLEX |
|---|---|---|---|
| UWP-1A | UWP-2A | UWP-3A | UWP-4A |
| — | UWP-2B | UWP-3B | UWP-4B |
| — | — | UWP-3C | UWP-4C |
| — | — | — | UWP-4D |

RADIO BASE DEVICE, MOBILE TERMINAL DEVICE, REFERENCE SIGNAL CONTROL METHOD, AND REFERENCE SIGNAL CONTROL PROGRAM

This application is a National Stage application of PCT/JP03/011944, filed Sep. 18, 2003, which claims priority from Japanese patent application no. 2002-274630(P) filed Sep. 20, 2002. The entire contents of the aforementioned application is incorporated herein by reference.

TECHNICAL FIELD

The present invention relates to a radio cell station apparatus, a personal station, a method of controlling a reference signal, and a program for controlling a reference signal. More particularly, the present invention relates to a radio cell station apparatus, a personal station, a method of controlling a reference signal, and a program for controlling a reference signal in space division multiple access.

BACKGROUND ART

Recently, in a rapidly-developing mobile communication system (for example, Personal Handyphone System: hereinafter, referred to as "PHS"), for efficient use of radio wave frequencies, SDMA (Space Division Multiple Access) in which a single time slot of a single frequency is spatially divided so that personal stations of a plurality of users can establish space division multiple access to a radio cell station system has been proposed.

In the SDMA, similarly to TDMA (Time Division Multiple Access) that has already been put into practical use, a time period (1 frame) using one frequency is divided into several time slots so as to allow each user to use different time slot. Accordingly, time-position control (burst synchronization control) for accurately transmitting signals to allocated time slots in order to avoid overlapping of the signal with other user's transmission is required at the time of transmission.

In the PHS, synchronous position detection utilizing what is called correlation synchronization has conventionally been known as a method of locating a synchronous position of a signal received from a personal station (hereinafter, referred to as "PS") in a cell station (hereinafter, referred to as "CS").

According to the synchronous position detection utilizing what is called correlation synchronization, a time-position at which an autocorrelation value attains a peak is specified as the synchronous position in the following manner. Specifically, in view of the fact that a reception signal from a PS includes in each frame a reference signal (a unique word signal: UW signal) section consisting of an already-known bit string common to all users, a CS calculates a correlation value (autocorrelation value) of an already-known waveform of the reference signal stored in a memory in advance and a waveform section cut out while shifting the waveform of a reception signal from the PS having a prescribed length.

The synchronous position detection utilizing such correlation synchronization, however, is based on the premise that the CS receives a signal from a single PS, and it is not adapted to a case in which the CS receives signals of the same frequency from two or more PSs in an overlapped manner.

In the SDMA in particular, a single time slot of the same frequency is spatially divided and resultant channels are allocated to a plurality of PSs. Therefore, it is highly likely that two or more signals of the same frequency arrive at the CS in an overlapped manner.

If synchronous positions of the reception signals from the PSs of the plurality of users coincide with one another, reference signal sections of the reception signals overlap with one another and the users cannot be identified or separated from one another, resulting in interference among the users.

In order to solve such a problem, control such as forming a directivity pattern in accordance with a direction of the PS by means of an adaptive array apparatus or slightly shifting a signal transmission time for each of the plurality of PSs establishing space division multiple access has been carried out so far in the CS.

In addition, recently, Japanese Patent Laying-Open No. 2001-231072 and "A Study of Training Signal Pattern for SDMA System," Takeo Miyata et al., Technical Report of IEICE, Vol. RCS2002-47, pp. 177-182, 2002, for example, have proposed a measure to prevent mutual interference among a plurality of users by appropriately separating and extracting communication data of each PS by designating different reference signal for each PS in the CS so that each user uses the designated reference signal.

Here, an operation for controlling allocation of a reference signal performed by the conventional CS on the PS will be described with reference to FIG. 7.

FIG. 7 is a flowchart illustrating an operation performed by a control unit within the CS when a link channel establishment request is received from the PS for initiating a call or data communication.

It is noted that, as the precondition for the operation in FIG. 7, a reference signal is stored as unique word information in advance in a unique word storage unit within the CS in a fixed manner.

The unique word information represents information obtained by associating a unique word value with information indicating a status that the unique word has been allocated. The unique word takes a 16-bit value such as "0011110101000110" expressed as a binary number, or a 32-bit value. In addition, the unique word takes a value specifying a PS such as user 1, user 2 and so on as a value indicating a status that the unique word has been allocated, or a value indicating that the unique word has not yet been allocated.

Referring to FIG. 7, initially, when a link channel establishment request is received from the PS (step S301) or when a link channel reestablishment request is received (step S302), a control unit searches for a channel available for allocation to the PS (step S303).

If there is no channel available for allocation (step S304), control such that a link channel allocation rejection notification is transmitted to the PS is exerted (step S308).

On the other hand, if there is a channel available for allocation (step S304), referring to the unique word held in the unique word storage unit, the control unit determines that an unallocated unique word is to be allocated to the PS and updates the unique word information so as to associate the unique word with the PS (step S305).

In addition, the control unit transmits to the PS a link channel allocation notification including notification of the determined, one unique word (step S306).

In this manner, the conventional CS receives from the plurality of PSs communication data in a form including a unique word different from each other. Therefore, using each unique word as the reference signal, communication data of each PS can appropriately be separated and extracted from the signals that have established space division multiple access by an adaptive array based on minimum mean square error (MMSE).

Accordingly, the CS can communicate with the PS in the SDMA while avoiding interference with other PS and maintaining communication quality.

As described above, in the CS shown in FIG. 7, when an unused unique word among a plurality of unique words held in the unique word storage unit is allocated to the PS that has issued a connection request in a link channel establishment phase, the unique word to be used in subsequent communication is fixed to this allocated unique word.

Meanwhile, in a communication environment in the SDMA, interference tends to be always intense and a spatial correlation value of the users varies every moment depending on increase or decrease in the number of users that establish multiple access to an identical channel. Therefore, if the reference signal including the unique word allocated at the time of connection request is used, synchronous position estimation accuracy and interference canceling performance by the adaptive array may deteriorate due to subsequent change in the number of multiplexed connections.

From the foregoing, an object of the present invention is to provide a radio cell station apparatus capable of estimating with high accuracy a synchronous position of a signal for each user regardless of change in the number of users that establish multiple access as well as separating and extracting a signal of a desired user in a stable manner, a personal station, a method of controlling a reference signal, and a program for controlling a reference signal.

DISCLOSURE OF THE INVENTION

According to one aspect of the present invention, a radio cell station apparatus to which a plurality of personal stations can establish space division multiple access, transmits to and receives from each of the plurality of personal stations a signal including an already-known reference signal different for each personal station. The radio cell station apparatus includes: multiplexed connection number detection means for detecting the number of multiplexed connections of the personal stations establishing space division multiple access; and means for allocating, by switching the reference signals that have been allocated to the personal stations establishing space division multiple access respectively prior to change in the number of multiplexed connections to reference signals capable of maintaining communication quality even after the number of multiplexed connections is changed, the switched reference signals to the plurality of personal stations respectively, when change in the number of multiplexed connections is detected in the multiplexed connection number detection means.

Preferably, the radio cell station apparatus further includes storage means for storing a reference signal optimized for each number of multiplexed connections of the personal stations establishing space division multiple access. When the number of multiplexed connections of the personal stations establishing space division multiple access is changed, the reference signal allocation means selects reference signals optimal for the changed number of multiplexed connections from the storage means and allocates the selected reference signals to the plurality of personal stations respectively.

More preferably, the reference signal stored in the storage means is calculated for each number of multiplexed connections based on a high autocorrelation characteristic and a low cross-correlation characteristic.

According to another aspect of the present invention, a personal station establishing space division multiple access to a radio cell station apparatus, transmits to and receives from the radio cell station apparatus a signal including an already-known reference signal different for each personal station. The personal station includes: means for receiving a request for switching a reference signal from the radio cell station apparatus in accordance with change in the number of multiplexed connections of the personal stations establishing space division multiple access; and means for switching the reference signal to a reference signal capable of maintaining communication quality even after the number of multiplexed connections is changed and transmitting a response to the request for switching to the radio cell station apparatus.

Preferably, the personal station further includes storage means for storing a reference signal optimized for each number of multiplexed connections of the personal stations establishing space division multiple access. When the request for switching the reference signal is received from the radio cell station apparatus, a reference signal optimal for the changed number of multiplexed connections is selected from the storage means and a response to the request for switching including the selected reference signal is transmitted to the radio cell station apparatus.

More preferably, the reference signal stored in the storage means is calculated for each number of multiplexed connections based on a high autocorrelation characteristic and a low cross-correlation characteristic.

According to yet another aspect of the present invention, in a method of controlling a reference signal performed by a radio cell station apparatus to which a plurality of personal stations can establish space division multiple access, the radio cell station apparatus transmits to and receives from each of the plurality of personal stations a signal including an already-known reference signal different for each personal station. The method of controlling a reference signal includes the steps of: detecting the number of multiplexed connections of the personal stations establishing space division multiple access; and when change in the number of multiplexed connections is detected in the step of detecting the number of multiplexed connections, switching the reference signals that have been allocated to the personal stations establishing space division multiple access respectively prior to change in the number of multiplexed connections to reference signals capable of maintaining communication quality even after the number of multiplexed connections is changed, and allocating the reference signals to the plurality of personal stations respectively.

Preferably, the method of controlling a reference signal further includes the step of storing a reference signal optimized for each number of multiplexed connections of the personal stations establishing space division multiple access. When the number of multiplexed connections of the personal stations establishing space division multiple access is changed, reference signals optimal for the changed number of multiplexed connections that have been stored are selected and the selected reference signals are allocated to the plurality of personal stations respectively.

More preferably, the step of storing a reference signal optimized for each number of multiplexed connections of the personal stations establishing space division multiple access further includes the step of calculating a reference signal for each number of multiplexed connections based on a high autocorrelation characteristic and a low cross-correlation characteristic.

According to yet another aspect of the present invention, in a method of controlling a reference signal performed by a personal station establishing space division multiple access to a radio cell station apparatus, the personal station transmits to and receives from the radio cell station apparatus a signal including an already-known reference signal different for each personal station. The method of controlling a reference signal includes the steps of: receiving a request for switching a reference signal from the radio cell station apparatus in accordance with change in the number of multiplexed connections of the personal stations establishing space division multiple access; and switching the reference signal to a reference signal capable of maintaining communication quality even after the number of multiplexed connections is changed and transmitting a response to the request for switching to the radio cell station apparatus.

Preferably, the method of controlling a reference signal further includes the step of storing a reference signal optimized for each number of multiplexed connections of the personal stations establishing space division multiple access. When the request for switching the reference signal is received from the radio cell station apparatus, a reference signal optimal for the changed number of multiplexed connections that has been stored is selected and a response to the request for switching including the selected reference signal is transmitted to the radio cell station apparatus.

More preferably, the step of storing a reference signal optimized for each number of multiplexed connections of the personal stations establishing space division multiple access further includes the step of calculating a reference signal for each number of multiplexed connections based on a high autocorrelation characteristic and a low cross-correlation characteristic.

According to yet another aspect of the present invention, in a program for controlling a reference signal performed by a radio cell station apparatus to which a plurality of personal stations can establish space division multiple access, the radio cell station apparatus transmits to and receives from each of the plurality of personal stations a signal including an already-known reference signal different for each personal station. The program for controlling a reference signal causes a computer to execute the steps of: detecting the number of multiplexed connections of the personal stations establishing space division multiple access; and when change in the number of multiplexed connections is detected in the step of detecting the number of multiplexed connections, switching the reference signals that have been allocated to the personal stations establishing space division multiple access respectively prior to change in the number of multiplexed connections to reference signals capable of maintaining communication quality even after the number of multiplexed connections is changed, and allocating the reference signals to the plurality of personal stations respectively.

Preferably, the program for controlling a reference signal further causes the computer to execute the step of storing a reference signal optimized for each number of multiplexed connections of the personal stations establishing space division multiple access. When the number of multiplexed connections of the personal stations establishing space division multiple access is changed, reference signals optimal for the changed number of multiplexed connections that have been stored are selected and the selected reference signals are allocated to the plurality of personal stations respectively.

More preferably, the step of storing a reference signal optimized for each number of multiplexed connections of the personal stations establishing space division multiple access further causes the computer to execute the step of calculating a reference signal for each number of multiplexed connections based on a high autocorrelation characteristic and a low cross-correlation characteristic.

According to yet another aspect of the present invention, in a program for controlling a reference signal performed by a personal station establishing space division multiple access to a radio cell station apparatus, the personal station transmits to and receives from the radio cell station apparatus a signal including an already-known reference signal different for each personal station. The program for controlling a reference signal causes a computer to execute the steps of: receiving a request for switching a reference signal from the radio cell station apparatus in accordance with change in the number of multiplexed connections of the personal stations establishing space division multiple access; and switching the reference signal to a reference signal capable of maintaining communication quality even after the number of multiplexed connections is changed and transmitting a response to the request for switching to the radio cell station apparatus.

Preferably, the program for controlling a reference signal further causes the computer to execute the step of storing a reference signal optimized for each number of multiplexed connections of the personal stations establishing space division multiple access. When the request for switching the reference signal is received from the radio cell station apparatus, a reference signal optimal for the changed number of multiplexed connections that has been stored is selected and a response to the request for switching including the selected reference signal is transmitted to the radio cell station apparatus.

More preferably, the step of storing a reference signal optimized for each number of multiplexed connections of the personal stations establishing space division multiple access further causes the computer to execute the step of calculating a reference signal for each number of multiplexed connections based on a high autocorrelation characteristic and a low cross-correlation characteristic.

Therefore, according to the present invention, the reference signal can be switched when necessary to the reference signal including the unique word optimal to the number of multiplexed connections in accordance with the change in the number of users who establish space division multiple access, for communication with each user. In this manner, a synchronous position of the signal for each user can be estimated with high accuracy, and a signal of a desired user can be separated and extracted in a stable manner.

BEST MODES FOR CARRYING OUT THE INVENTION

Figure 1:
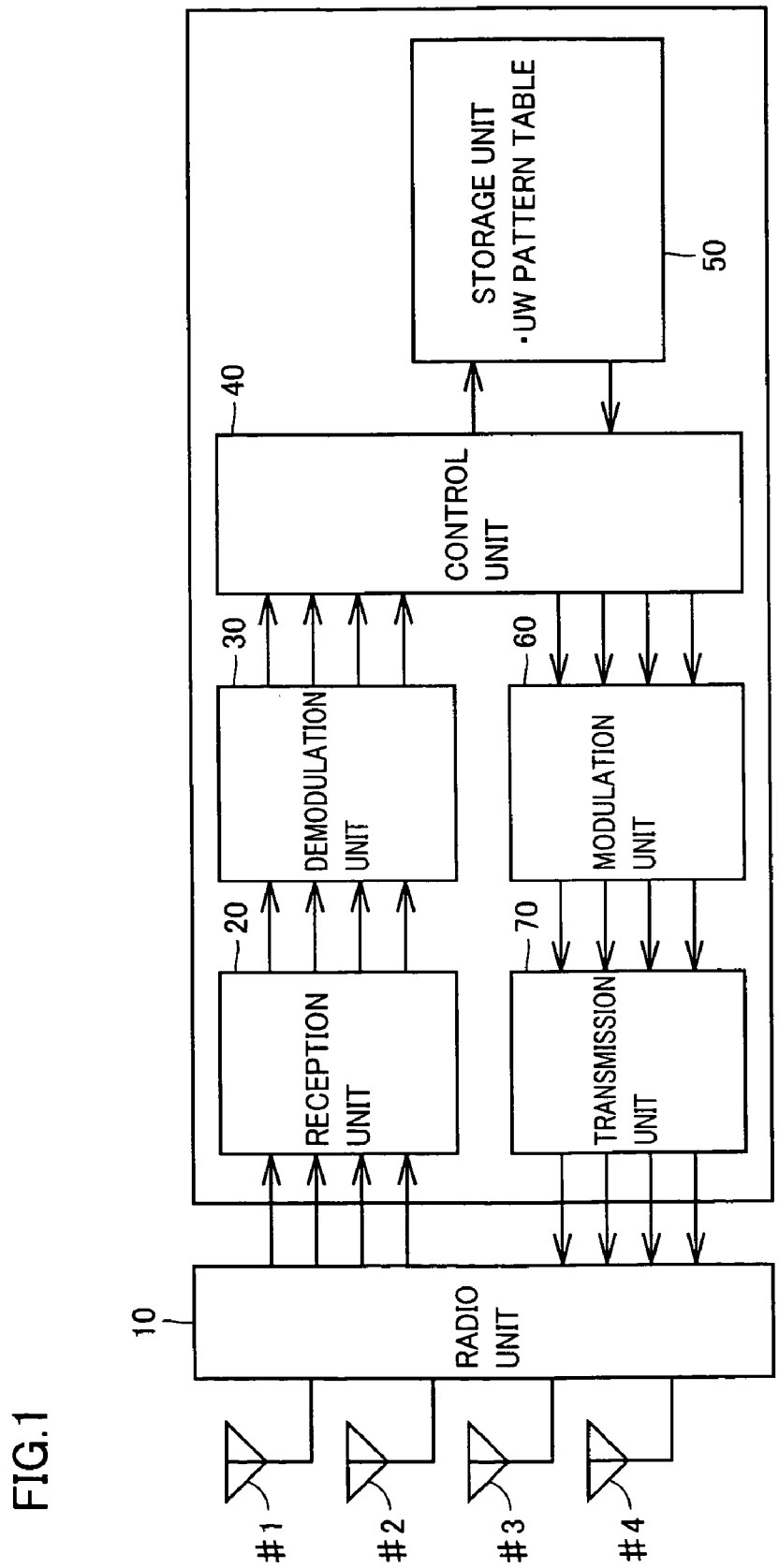
FIG. 1 is a functional block diagram showing a configuration of a radio cell station according to a first embodiment of the present invention.

Embodiments of the present invention will be described in detail hereinafter with reference to the drawings. The same or corresponding elements have the same reference characters allotted.

First Embodiment

FIG. 1 is a functional block diagram showing a configuration of a cell station in a radio cell station apparatus according to a first embodiment of the present invention.

Referring to FIG. 1, a radio cell station includes a radio unit 10, a plurality of antennas (four antennas of antennas #1 to #4, for example), a reception unit 20, a demodulation unit 30, a control unit 40, a storage unit 50, a modulation unit 60, and a transmission unit 70.

Antennas #1 to #4 are connected to radio unit 10.

In reception, signals received by antennas #1 to #4 are provided to reception unit 20 through radio unit 10. The reception signals provided to reception unit 20 are subjected to various types of analog signal processing such as amplification and frequency conversion, and converted to digital signals by an A/D converter (not shown). In addition, reception unit 20 separates and extracts a signal of each user under the control of control unit 40. The separated and extracted reception signal of each user is provided to demodulation unit 30, and subjected to necessary demodulation processing and time-division processing. The original signal is thus recovered and output to public switched telephone network (not shown) through control unit 40.

On the other hand, in transmission, a transmission signal provided from the public switched telephone network (not shown) is provided to modulation unit 60 through control unit 40, subjected to necessary time-division processing and modulation processing, and provided to transmission unit 70. In transmission unit 70, the transmission signal is converted to an analog signal by a D/A converter (not shown) and subjected to various types of analog signal processing such as amplification and frequency conversion necessary for radio transmission.

In transmission, a signal from transmission unit 70 is supplied to antennas #1 to #4 through radio unit 10, and transmitted to a desired PS from antennas #1 to #4.

Specifically, control unit 40 is implemented by a CPU, and controls the entire CS. In particular, control unit 40 allocates a channel to the PS when control unit 40 receives a call from the PS through a control channel and when it receives an incoming call through the public switched telephone network (not shown).

Specifically, storage unit 50 is implemented by a memory, and has a table for holding a unique word pattern optimized for each number of multiplexed connections, as will be described later. Holding and reading of the unique word pattern is carried out in response to an instruction from control unit 40.

Figures 2, 3:
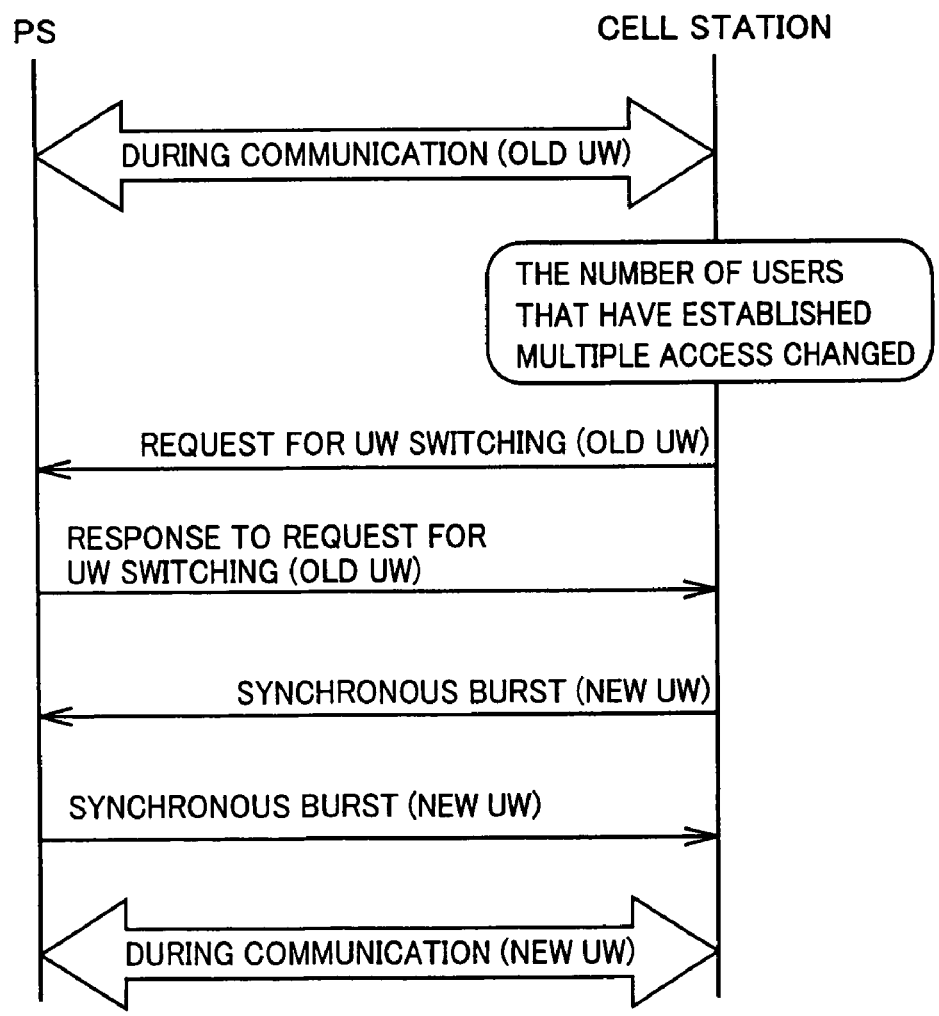
FIG. 2 shows a table of an optimal unique word pattern adapted to each number of multiplexed connections held in a storage unit 50 in FIG. 1.
FIG. 3 shows a communication sequence between a CS and a PS according to the first embodiment of the present invention.

FIG. 2 shows the table of an optimal unique word pattern adapted to each number of multiplexed connections held in storage unit 50 in FIG. 1.

Referring to FIG. 2, the unique word pattern is optimized for each number of multiplexed connections and stored.

For example, when there are two multiplexed connections, the unique word pattern corresponding to unique word numbers "UWP-2A" and "UWP-2B" is stored.

It is noted that each unique word pattern is constituted of a total of four patterns: a pattern for uplink consisting of 16 bits; a pattern for downlink consisting of 16 bits; a pattern for uplink consisting of 32 bits; and a pattern for downlink consisting of 32 bits.

This is because both of the uplink and the downlink of a channel between the CS and the PS consist of a signal control channel (hereinafter, referred to as SCCH) for transmitting information necessary for connecting a call and a traffic channel (hereinafter, referred to as TCH) used for communication, and because the SCCH and the TCH include unique words consisting of 32 bits and 16 bits respectively.

The unique word pattern optimal for each number of multiplexed connections is determined by selecting from a randomly generated 16-bit or 32-bit signal train, a bit pattern satisfying such a condition that an autocorrelation characteristic is excellent and a cross-correlation characteristic between patterns is low.

This is because, in order to estimate the synchronous position with high accuracy in the SDMA employing the adaptive array, the excellent autocorrelation characteristic of the reference signal itself and the excellent cross-correlation characteristic with an interfering user signal during communication are desired.

In addition, this is also because a cross-correlation value between the signal trains of the users is desirably low, in order to learn weight with high performance. In the case of radio communication, different delay due to a distance is caused for each user, depending on a distance between a terminal and a cell station. Therefore, even when there is a timing difference between the users, a constantly low cross-correlation characteristic is desirable.

For example, among the conditions above, the excellent autocorrelation characteristic is determined, using as a reference a condition that an autocorrelation value is not higher than the threshold value (0.3, for example) in a determination section, the determination section referring to a section excluding ±1 symbol around an identical timing at which the autocorrelation value attains its peak.

In addition, the low cross-correlation characteristic is determined, using as a reference a condition that the cross-correlation value is constantly not higher than the threshold value (0.5, for example) in a wide section.

Based on the specifications as above, the unique word pattern selected for each number of multiplexed connections is held in the table in FIG. 2 within storage unit 50 in FIG. 1.

Moreover, as described previously, the pattern is extracted by control unit 40 in FIG. 1 in accordance with increase or decrease in the number of users establishing multiple access to the cell station, and the user is notified of the pattern along with a request for switching.

FIG. 3 shows a communication sequence between the CS and the PS according to the first embodiment of the present invention.

Referring to FIG. 3, initially, the PS and the CS establish a link channel. Thereafter, the PS and the CS communicate with each other using the unique word pattern optimal for the number of multiplexed connections designated by the CS.

For example, when there are two multiplexed connections, the unique word pattern corresponding to "UWP-2A" or "UWP-2B" is designated as the pattern for duplex for the two users, out of the patterns shown in FIG. 2.

It is assumed here that the number of multiplexed connections to the CS established by the PSs has been changed due to issuance of a connection request from other PS to the CS. In the example above, the number of multiplexed connections is increased from 2 to 3.

The CS selects a unique word pattern optimal for the new number of multiplexed connections from the table in FIG. 2, and requests switching from the old unique word to the new unique word to each PS of the user that has established multiple access.

In succession, when a response to the request for switching is received from the PS of each user, the CS transmits a synchronous burst signal including the new unique word to the PS, and the PS returns the synchronous burst signal including the new unique word. Synchronization is thus established. For example, when there are three multiplexed connections, the pattern corresponding to "UWP-3A", "UWP-3B" and "UWP-3C" is selected as the pattern for triplex out of the patterns shown in FIG. 2, and allocated to each user as the new unique word.

In this manner, after synchronization is established, the CS and each PS communicate with each other using the reference signal including the unique word optimal for the number of multiplexed connections. Therefore, a synchronous position for each user can be estimated with high accuracy, and a signal of a desired user can be separated and extracted in a stable manner, whereby communication quality can be maintained.

Figure 4:
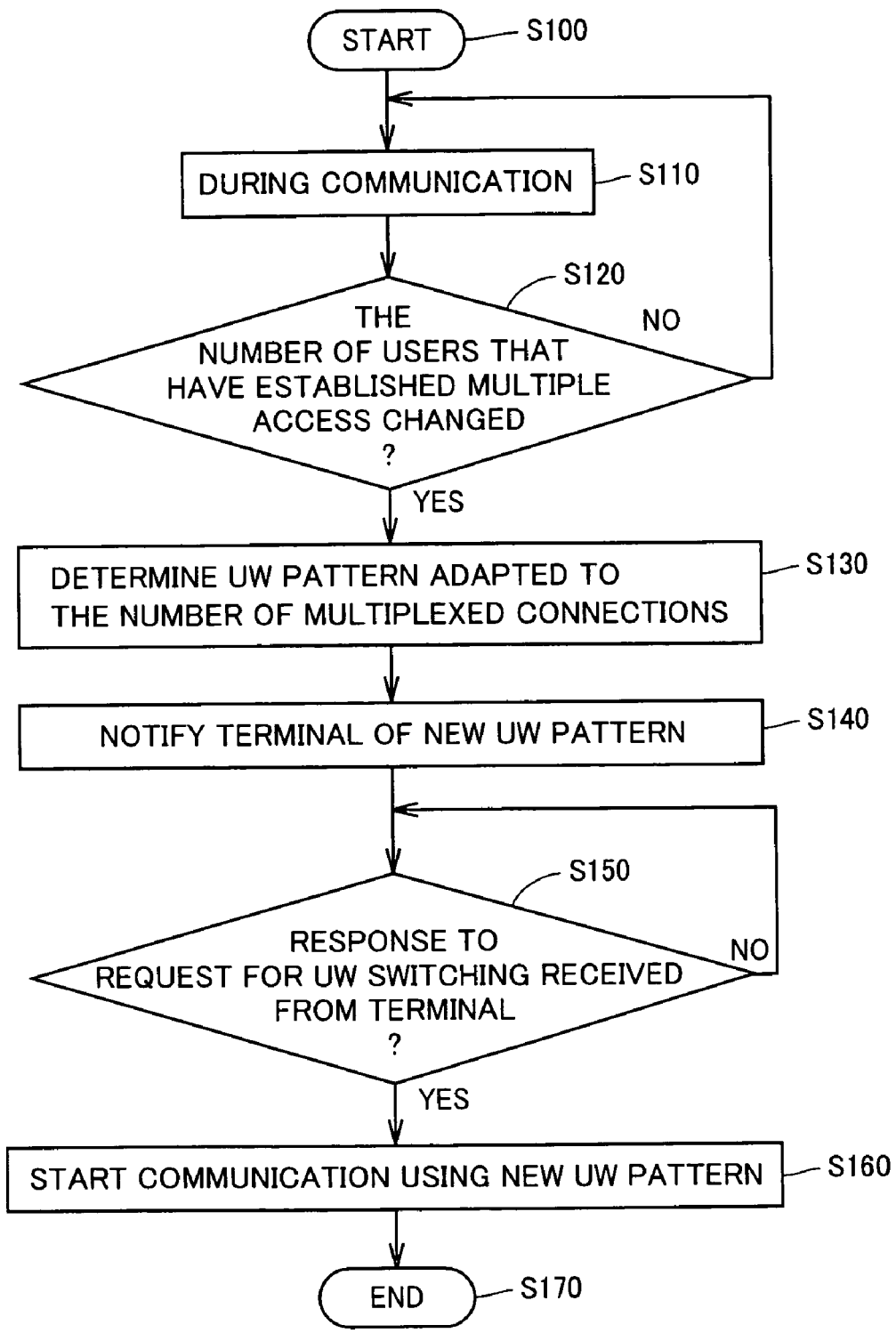
FIG. 4 is a flowchart illustrating an operation performed by the cell station in a unique word switching processing in FIG. 3.

FIG. 4 is a flowchart illustrating an operation performed by the cell station in a unique word switching processing in FIG. 3.

The configuration in the functional block diagram of the cell station shown in FIG. 1 is executed in software in accordance with the flowchart shown in FIG. 4, actually by a not-shown digital signal processor (DSP). The DSP reads a program including each step in the flowchart shown in FIG. 4 from a not-shown memory and executes the same. The program can be downloaded from a center (not shown) through a not-shown circuit control unit and a public network.

Referring to FIG. 4, initially, it is assumed that the CS communicates with each PS that has established multiple access using the unique word pattern optimal for the number of multiplexed connections (step S110).

Concurrently, control unit 40 of the CS shown in FIG. 1 constantly determines whether or not the number of multiplexed connections has been changed, based on the connection request from a new user or completion of communication by another user (step S120).

If change in the number of multiplexed connections is confirmed, control unit 40 of the CS selects the unique word pattern optimal for the changed number of multiplexed connections from the table in storage unit 50 (step S130).

Then, the CS notifies each PS of the selected new unique word pattern, along with a request for unique word switching (step S140).

In addition, at step S150, when the PS gives a response to the request for unique word switching, the CS and the PS carry out synchronous burst using the reference signal including the new unique word, and thereafter start communication (step S160), On the other hand, at step S150, if no response to the request for unique word switching is given from the PS, the CS transmits the request for switching to the PS until a response is given.

As described above, according to the first embodiment of the present invention, the unique word can be switched to the pattern optimal to the number of multiplexed connections in accordance with the change in the number of multiplexed connections. Therefore, the CS can enhance accuracy in estimating a synchronous position of each user, and separate and extract a signal from each user in a stable manner, whereby communication quality can be maintained.

Second Embodiment

Figure 5:
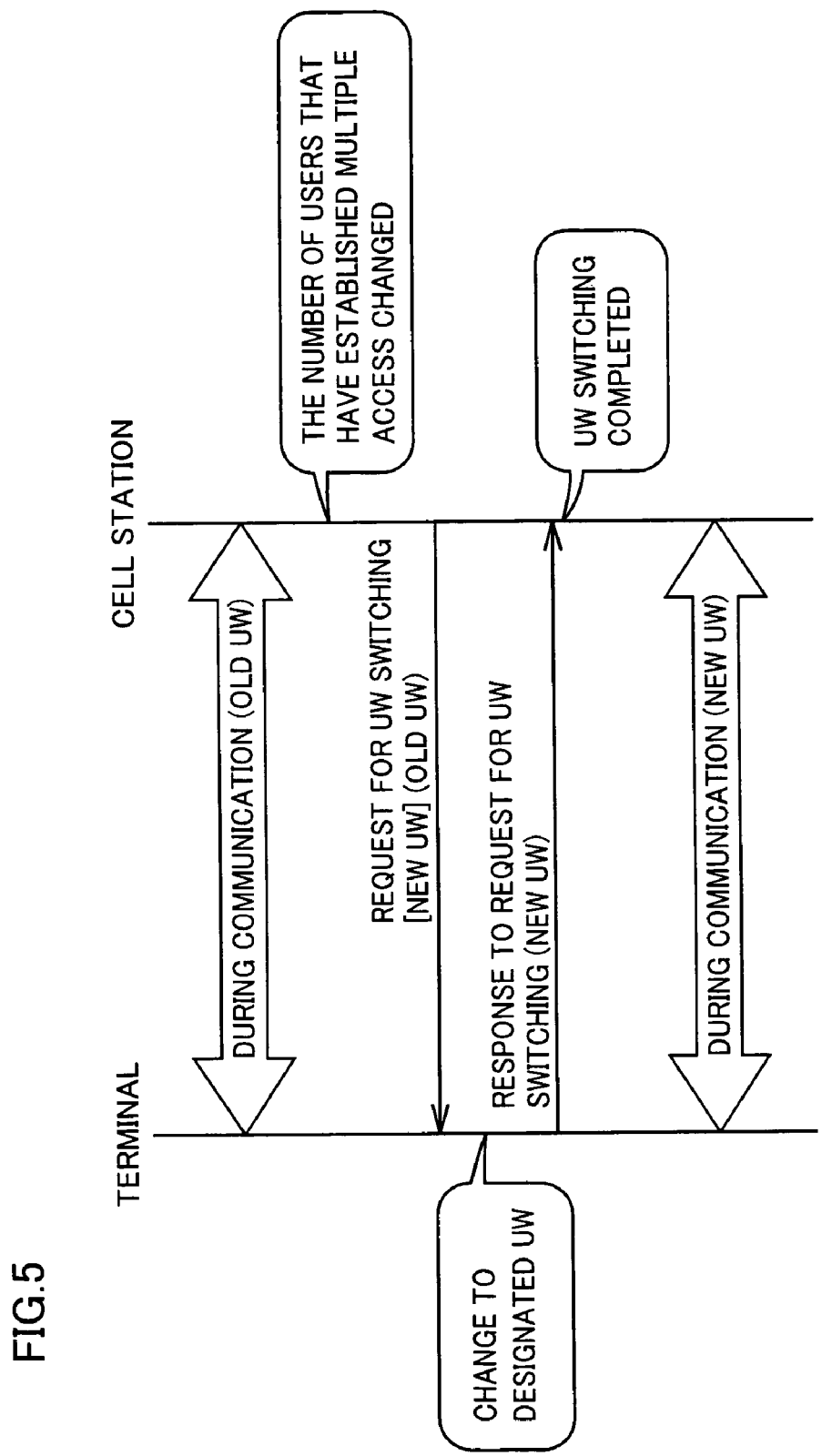
FIG. 5 shows a communication sequence between a CS and a PS according to a second embodiment of the present invention.

FIG. 5 shows a communication sequence between a CS and a PS according to a second embodiment of the present invention.

As the precondition for the communication sequence in FIG. 5, the CS and the PS in the second embodiment are different from the CS and the PS in the first embodiment in that a storage unit configured in a manner similar to storage unit 50 in FIG. 1 is contained.

The storage unit in each of the CS and the PS has a table of the unique word pattern optimized for each number of multiplexed connections shown in FIG. 2 in the first embodiment. Therefore, the PS also can select a new unique word in accordance with the change in the number of multiplexed connections.

Referring to FIG. 5, initially, the PS and the CS establish a link channel. Thereafter, the PS and the CS communicate with each other using the unique word pattern optimal for the number of multiplexed connections designated by the CS.

It is assumed here that the number of multiplexed connections of the PSs to the CS has been changed due to issuance of a connection request from another PS to the CS or completion of communication by another PS.

The CS requests switching from the old unique word including information on change in the number of multiplexed connections to the new unique word to each PS of the user that has established multiple access.

In succession, when a response to the request for switching is received from the CS, the PS of each user selects a unique word pattern optimal for the changed number of multiplexed connections from the unique word pattern table in the storage unit, and gives a response to the request for switching to the CS, using the reference signal including the new unique word.

In this manner, the processing for switching the unique words performed between the CS and the PS is completed. Thereafter, the CS and each PS communicate with each other using the reference signal including the unique word optimal for the number of multiplexed connections.

In the second embodiment, both of the cell station and the terminal possess the table of the unique word pattern. As compared with the cell station and the terminal in the first embodiment, transition to the new unique word can be made solely by requesting unique word switching, and communication can be continued without the synchronous burst processing.

Figure 6:
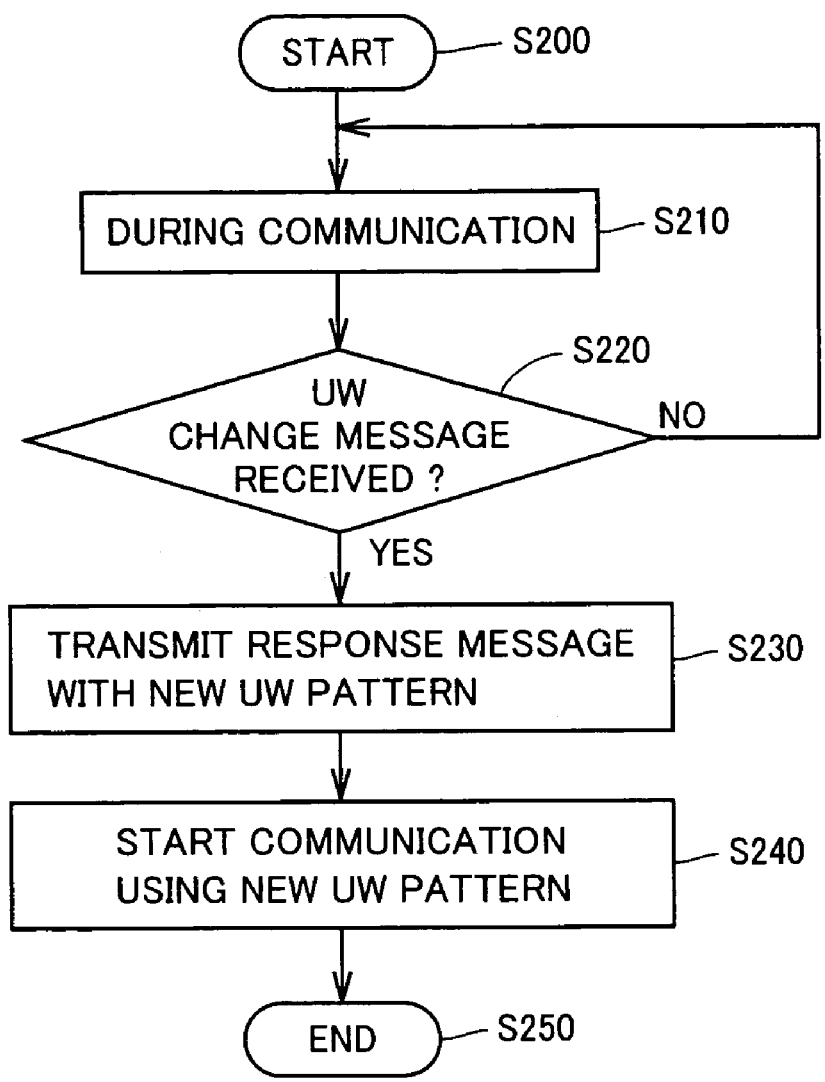
FIG. 6 is a flowchart illustrating an operation performed by a terminal in a unique word switching processing in FIG. 5.
Figure 7:
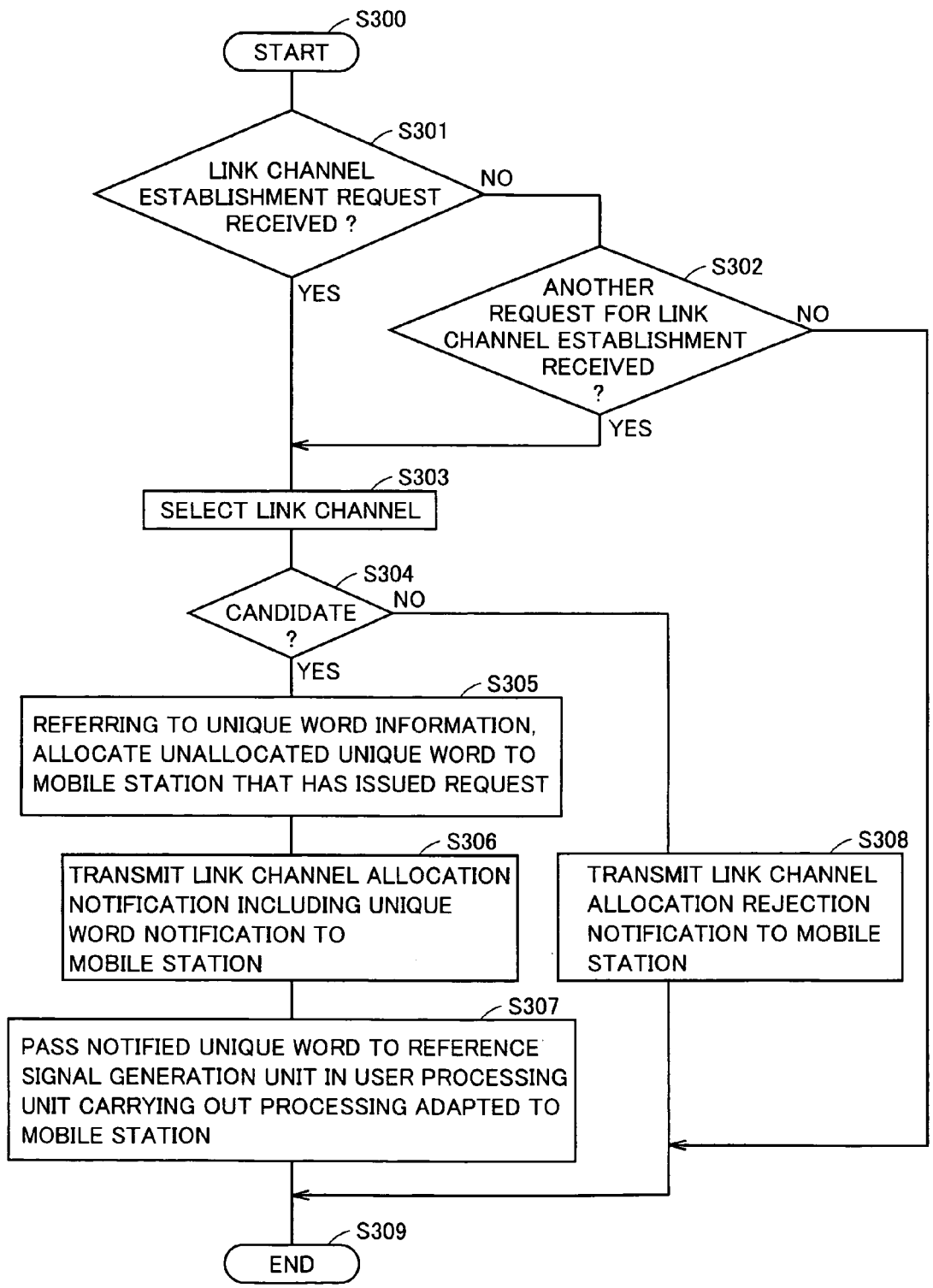
FIG. 7 is a flowchart illustrating an operation performed by a control unit of a conventional CS.

FIG. 6 is a flowchart illustrating an operation performed by a terminal in a unique word switching processing in FIG. 5.

Though not shown, in the terminal as well, the DSP runs with software in accordance with the flowchart shown in FIG. 6. The DSP reads a program including each step in the flowchart shown in FIG. 6 from a memory and executes the same. The program can be downloaded from a center (not shown) through a not-shown circuit control unit and a public network.

Referring to FIG. 6, initially, it is assumed that each PS that has established multiple access communicates with the CS using the unique word pattern optimal for the number of multiplexed connections (step S210).

Here, the PS constantly determines whether or not the request for switching the unique word has been issued from the CS due to the change in the number of multiplexed connections (step S220).

If the request for switching from the CS is confirmed, the control unit of the PS selects the unique word pattern optimal for the changed number of multiplexed connections from the table in the storage unit, and responds to the request for switching, using the reference signal including the new unique word (step S230).

In addition, when the CS receives the response including the new unique word, communication using the reference signal including the new unique word is carried out thereafter (step S240).

As described above, according to the second embodiment of the present invention, the unique word is changed to the optimal unique word when necessary, in accordance with the change in the number of multiplexed connections for communication. Therefore, a synchronous position of each user can be estimated with high accuracy, and a signal from each user can be separated and extracted in a stable manner.

In addition, the terminal also includes the table of the optimal unique word pattern, so that the response to the request for unique word switching can be given using the new unique word pattern. Therefore, communication can be continued without another synchronous burst.

As described above, according to the present invention, the unique word can be switched to the pattern optimal to the number of multiplexed connections when necessary in accordance with the change in the number of multiplexed connections. Therefore, the CS can estimate a synchronous position of each user with high accuracy, and separate and extract a signal from each user in a stable manner, whereby communication quality can be maintained.

It is noted that the unique word fixed for each PS of the user that has established multiple access can be varied in accordance with the change in the number of multiplexed connections. Therefore, communication can be carried out while attaining a high communication quality regardless of the increase or decrease in the number of multiplexed connections.

Moreover, according to the present invention, the terminal also includes the table of the unique word pattern optimized for each number of multiplexed connections, so that the response to the request for unique word switching can be given using the new unique word pattern. Therefore, communication can be continued without another synchronous burst.

INDUSTRIAL APPLICABILITY

As described above, with the radio cell station apparatus, the personal station, the method of controlling a reference signal, and the program for controlling a reference signal according to the present invention, communication quality can be maintained even when the number of multiplexed connections established by the users is changed. Therefore, the present invention is useful in a mobile communication system in which a plurality of users establish multiple access.

The invention claimed is:

1. A radio cell station apparatus to which a plurality of personal stations can establish space division multiple access, comprising:
    a transmitting and receiving unit for transmitting to and receiving from each of the personal stations a signal including a reference signal, which is a signal train consisting of a plurality of bits, and used for a synchronization process of a reception signal from each of the personal stations;
    a reference signal defining unit for defining one or more reference signals optimized for each multiplexed connection number of the personal stations establishing said space division multiple access to said radio cell station apparatus;
    a multiplexed connection number detection unit for detecting a number of multiplexed connections of the personal stations establishing space division multiple access during communication; and
    a reference signal allocation unit for:
        switching the reference signals that have been allocated to the personal stations establishing space division multiple access respectively prior to a change in the number of multiplexed connections to reference signals for maintaining communication quality even after the number of multiplexed connections is changed, and
        allocating the switched reference signals to said plurality of personal stations respectively, when the change in the number of multiplexed connections is detected during communication in said multiplexed connection number detection unit.

2. The radio cell station apparatus according to claim 1, further comprising a storage unit for storing a reference signal optimized for each number of multiplexed connections of the personal stations establishing space division multiple access, wherein
    when the number of multiplexed connections of the personal stations establishing space division multiple access is changed, said reference signal allocation unit selects reference signals optimal for the changed number of multiplexed connections from said storage unit and allocates the selected reference signals to said plurality of personal stations respectively.

3. The radio cell station apparatus according to claim 2, wherein
    said reference signal stored in said storage unit is calculated for each number of multiplexed connections based on a high autocorrelation characteristic and a low cross-correlation characteristic.

4. A personal station establishing space division multiple access to a radio cell station apparatus, comprising:
    a transmitting and receiving unit for transmitting to and receiving from said radio cell station apparatus a signal including a reference signal, which is a signal train consisting of a plurality of bits, used for a synchronization process of a reception signal from each of said personal stations, defined in said radio cell station apparatus and optimized for each multiplexed connection number of the personal stations establishing said space division multiple access to said radio cell station apparatus;
    a receiving unit for receiving a request for switching a reference signal from said radio cell station apparatus in accordance with a change in the number of multiplexed connections of the personal stations establishing space division multiple access during communication; and
    a switching unit for switching the reference signal to a reference signal for maintaining communication quality even after the number of multiplexed connections is changed and transmitting a response to the request for switching to said radio cell station apparatus.

5. The personal station according to claim 4, further comprising a storage unit for storing a reference signal optimized for each number of multiplexed connections of the personal stations establishing space division multiple access, wherein
    when the request for switching the reference signal is received from said radio cell station apparatus, a reference signal optimal for the changed number of multiplexed connections is selected from said storage unit and a response to the request for switching including the selected reference signal is transmitted to said radio cell station apparatus.

6. The personal station according to claim 5, wherein
said reference signal stored in said storage unit is calculated for each number of multiplexed connections based on a high autocorrelation characteristic and a low cross-correlation characteristic.

7. A method of controlling a reference signal performed by a radio cell station apparatus to which a plurality of personal stations can establish space division multiple access, comprising the steps of:
transmitting to and receiving from each of the personal stations a communication signal including a reference signal, which is a signal train consisting of a plurality of bits, and used for a synchronization process of a reception signal from each of the personal stations;
defining one or more reference signals optimized for each multiplexed connection number of the personal stations establishing said space division multiple access to said radio cell station apparatus;
detecting a number of multiplexed connections of the personal stations establishing space division multiple access during communication; and
when a change in the number of multiplexed connections is detected in said step of detecting the number of multiplexed connections, switching the reference signals that have been allocated to the personal stations establishing space division multiple access respectively prior to change in the number of multiplexed connections to reference signals for maintaining communication quality even after the number of multiplexed connections is changed, and allocating the reference signals to said plurality of personal stations respectively.

8. The method of controlling a reference signal according to claim 7, further comprising the step of storing a reference signal optimized for each number of multiplexed connections of the personal stations establishing space division multiple access, wherein
when the number of multiplexed connections of the personal stations establishing space division multiple access is changed, reference signals optimal for the changed number of multiplexed connections that have been stored are selected and the selected reference signals are allocated to said plurality of personal stations respectively.

9. The method of controlling a reference signal according to claim 8, wherein
the step of storing a reference signal optimized for each number of multiplexed connections of the personal stations establishing space division multiple access further includes the step of calculating a reference signal for each number of multiplexed connections based on a high autocorrelation characteristic and a low cross-correlation characteristic.

10. A method of controlling a reference signal performed by a personal station establishing space division multiple access to a radio cell station apparatus, comprising the steps of:
transmitting to and receiving from said radio cell station apparatus a communication signal including a reference signal, which is a signal train consisting of a plurality of bits, used for a synchronization process of a reception signal from each of said personal stations, defined in said radio cell station apparatus and optimized for each multiplexed connection number of the personal stations establishing said space division multiple access to said radio cell station apparatus;
receiving a request for switching a reference signal from said radio cell station apparatus in accordance with change in the number of multiplexed connections of the personal stations establishing space division multiple access during communication; and
switching the reference signal to a reference signal for maintaining communication quality even after the number of multiplexed connections is changed and transmitting a response to the request for switching to said radio cell station apparatus.

11. The method of controlling a reference signal according to claim 10, further comprising the step of storing a reference signal optimized for each number of multiplexed connections of the personal stations establishing space division multiple access, wherein
when the request for switching the reference signal is received from said radio cell station apparatus, a reference signal optimal for the changed number of multiplexed connections that has been stored is selected and a response to the request for switching including the selected reference signal is transmitted to said radio cell station apparatus.

12. The method of controlling a reference signal according to claim 11, wherein
the step of storing a reference signal optimized for each number of multiplexed connections of the personal stations establishing space division multiple access further includes the step of calculating a reference signal for each number of multiplexed connections based on a high autocorrelation characteristic and a low cross-correlation characteristic.

13. A computer program embodied in a computer readable medium, for controlling a reference signal performed by a radio cell station apparatus to which a plurality of personal stations can establish space division multiple access, causing a computer to execute the steps of:
transmitting to and receiving from each of the personal stations a communication signal including a reference signal, which is a signal train consisting of a plurality of bits, and used for a synchronization srocess of a reception signal from each of the personal stations;
defining one or more reference signals optimized for each multiplexed connection number of the personal stations establishing said space division multiple access to said radio cell station apparatus;
detecting a number of multiplexed connections of the personal stations establishing space division multiple access during communication; and
when a change in the number of multiplexed connections is detected in said step of detecting the number of multiplexed connections, switching the reference signals that have been allocated to the personal stations establishing space division multiple access respectively prior to change in the number of multiplexed connections to reference signals for maintaining communication quality even after the number of multiplexed connections is changed, and
allocating the reference signals to said plurality of personal stations respectively.

14. The computer program embodied in a computer readable medium, for controlling a reference signal according to claim 13, further causing the computer to execute the step of storing a reference signal optimized for each number of multiplexed connections of the personal stations establishing space division multiple access, wherein
when the number of multiplexed connections of the personal stations establishing space division multiple access is changed, reference signals optimal for the changed number of multiplexed connections that have been stored are selected and the selected reference signals are allocated to said plurality of personal stations respectively.

15. The computer program embodied in a computer readable medium, for controlling a reference signal according to claim 14, wherein
the step of storing a reference signal optimized for each number of multiplexed connections of the personal stations establishing space division multiple access further causes the computer to execute the step of calculating a reference signal for each number of multiplexed connections based on a high autocorrelation characteristic and a low cross-correlation characteristic.

16. A computer program embodied in a computer readable medium, for controlling a reference signal performed by a personal station establishing space division multiple access to a radio cell station apparatus, causing a computer to execute the steps of:
transmitting to and receiving from said radio cell station apparatus a communication signal including a reference signal, which is a signal train consisting of a plurality of bits, used for a synchronization process of a reception signal from each of said personal stations, defined in said radio cell station apparatus and optimized for each multiplexed connection number of the personal stations establishing said space division multiple access to said radio cell station apparatus;
receiving a request for switching a reference signal from said radio cell station apparatus in accordance with change in the number of multiplexed connections of the personal stations establishing space division multiple access during communication; and
switching the reference signal to a reference signal for maintaining communication quality even after the number of multiplexed connections is changed and transmitting a response to the request for switching to said radio cell station apparatus.

17. The computer program embodied in a computer readable medium, for controlling a reference signal according to claim 16, further causing the computer to execute the step of storing a reference signal optimized for each number of multiplexed connections of the personal stations establishing space division multiple access, wherein
when the request for switching the reference signal is received from said radio cell station apparatus, a reference signal optimal for the changed number of multiplexed connections that has been stored is selected and a response to the request for switching including the selected reference signal is transmitted to said radio cell station apparatus.

18. The computer program embodied in a computer readable medium, for controlling a reference signal according to claim 17, wherein the step of storing a reference signal optimized for each number of multiplexed connections of the personal stations establishing space division multiple access further causes the computer to execute the step of calculating a reference signal for each number of multiplexed connections based on a high autocorrelation characteristic and a low cross-correlation characteristic.

19. The radio cell station apparatus according to claim 1, wherein
an optimal reference signal pattern for each multiplexed connection number is defined on condition that each signal for said personal station establishing space division multiple access can be separated and extracted in a stable manner.

20. The personal station according to claim 4, wherein
an optimal reference signal pattern for each multiplexed connection number is defined on condition that each signal for said personal station establishing space division multiple access can be separated and extracted in a stable manner.

21. The method of controlling a reference signal according to claim 7, wherein
an optimal reference signal pattern for each multiplexed connection number is defined on condition that each signal for said personal station establishing space division multiple access can be separated and extracted in a stable manner.

22. The method of controlling a reference signal according to claim 10, wherein
an optimal reference signal pattern for each multiplexed connection number is defined on condition that each signal for said personal station establishing space division multiple access can be separated and extracted in a stable manner.

23. The computer program, embodied in a computer readable medium, for controlling a reference signal according to claim 13, wherein
an optimal reference signal pattern for each multiplexed connection number is defined on condition that each signal for said personal station establishing space division multiple access can be separated and extracted in a stable manner.

24. The computer program, embodied in a computer readable medium, for controlling a reference signal according to claim 16, wherein
an optimal reference signal pattern for each multiplexed connection number is defined on condition that each signal for said personal station establishing space division multiple access can be separated and extracted in a stable manner.

* * * * *